United States Patent
Nebel et al.

(10) Patent No.: US 7,352,505 B2
(45) Date of Patent: Apr. 1, 2008

(54) DEVICE AND METHOD FOR CONVERTING AN OPTICAL FREQUENCY

(75) Inventors: Achim Nebel, Trippstadt (DE); Bernhard Henrich, Kaiserslautern (DE); Thomas Herrmann, Stelzenberg (DE)

(73) Assignee: Lumera Laser GmbH, Kaiserslautern (DE)

( * ) Notice: Subject to any disclaimer, the term of this patent is extended or adjusted under 35 U.S.C. 154(b) by 166 days.

(21) Appl. No.: 10/490,844

(22) PCT Filed: Sep. 9, 2002

(86) PCT No.: PCT/EP02/10090
§ 371 (c)(1),
(2), (4) Date: Mar. 25, 2004

(87) PCT Pub. No.: WO03/029892
PCT Pub. Date: Apr. 10, 2003

(65) Prior Publication Data
US 2004/0240491 A1 Dec. 2, 2004

(30) Foreign Application Priority Data
Sep. 26, 2001 (DE) ............................... 101 47 362

(51) Int. Cl.
*H01S 3/10* (2006.01)
*H01S 3/08* (2006.01)
*G02F 2/02* (2006.01)

(52) U.S. Cl. ................... 359/329; 372/23; 372/105; 372/22

(58) Field of Classification Search ............... 372/22, 372/23, 105, 21; 359/326, 328, 329
See application file for complete search history.

(56) References Cited

U.S. PATENT DOCUMENTS 5,047,668 A * 9/1991 Bosenberg ............... 359/330

(Continued)

FOREIGN PATENT DOCUMENTS

DE 101 43 709 A1 4/2003

(Continued)

OTHER PUBLICATIONS

Szabo, G. and Bor, Zs, "Frequency Conversion of Ultrashort Pulses", Department of Optics and Quantum Electronics, (pp. 237-241), Nov. 24, 2003.

(Continued)

*Primary Examiner*—Minsun Harvey
*Assistant Examiner*—Marcia A. Golub

(57) ABSTRACT

To optimise the transformation rate (efficiency) in the optical frequency conversion of laser beams of ultra-short light pulses in optically non-linear media such as a crystal (56), a double refracting crystal (54) is arranged in the beam path before the optically non-linear medium (56). The length of the double refracting crystal (54) is selected and the orientation of its optical crystal axis in relation to the propagation direction of the laser beams involved in the frequency conversion is set such that the change caused by the double refracting crystal (54) in the location, time and direction of incidence of the laser pulses (14) and (16) on the optically non-linear medium (56) and the resulting change in the spatial and temporal overlap of the laser pulses in the optically non-linear medium (56) for optical frequency conversion in the crystal (56) give a conversion efficiency which is higher than the conversion efficiency which would be achieved without the double refracting crystal (54).

30 Claims, 6 Drawing Sheets

Figure 1:
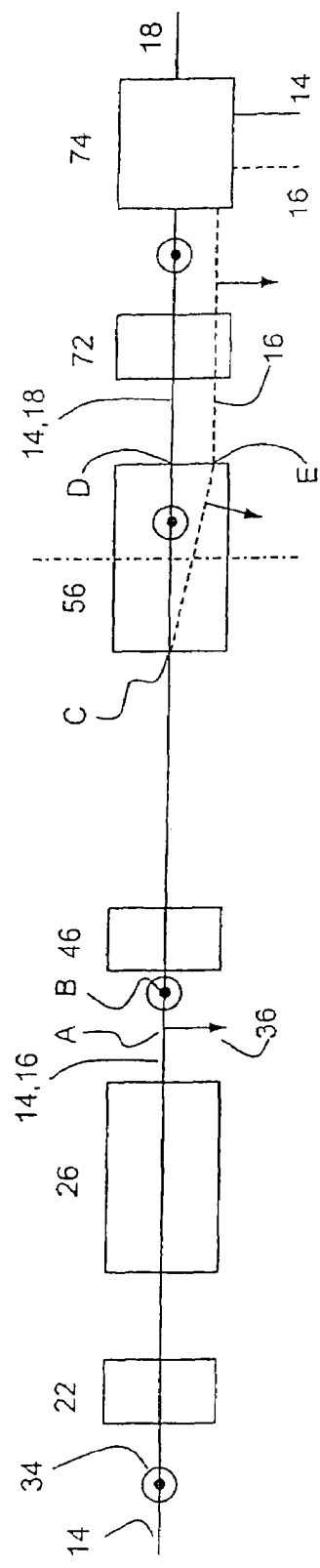

Frequency tripling:
Non-critical doubling (26)
Compensator (54)
Type II frequency tripling (56)

U.S. PATENT DOCUMENTS

| | | | |
|---|---|---|---|
| 5,384,803 A | | 1/1995 | Lai |
| 5,500,865 A | * | 3/1996 | Chakmakjian et al. ........ 372/22 |
| 5,835,513 A | * | 11/1998 | Pieterse et al. ............... 372/22 |
| 5,848,079 A | | 12/1998 | Kortz et al. |
| 5,852,620 A | | 12/1998 | Wan |
| 6,130,900 A | * | 10/2000 | Black et al. ................... 372/25 |
| 6,215,580 B1 | * | 4/2001 | Kouta ......................... 359/328 |
| 2003/0043452 A1 | * | 3/2003 | Heist .......................... 359/326 |

FOREIGN PATENT DOCUMENTS

| | | |
|---|---|---|
| EP | 0 503 875 A2 | 9/1992 |
| GB | 2 379 278 A | 3/2003 |

OTHER PUBLICATIONS

Smith, A.V.; Armstrong, D.J.; and Alford, W.J., "Increased acceptance bandwidths in optical frequency conversion by use of multiple walk-off-compensating nonlinear crystals", Optical Society of America, (pp. 122-141), 1998.

Gehr, Russell J.; Kimmel, Mark W.; and Smith, A.V., "Simultaneous spatial and temporal walk-off compensation in frequency-doubling femtosecond pulses in $\beta$-$BaB_2O_4$", Optical Society of America, (pp. 1298-1300), May 12, 1998.

Buffing, B.; Nebel, A.; and Wallenstein, R., "High-power picosecond $LiB_3O_5$ optical parametric oscillators tunable in the blue spectral range", Sprilner-Verlag, (pp. 137-149), Nov. 22, 2000.

* cited by examiner

Frequency tripling:
Non-critical doubling (26)
Type II frequency tripling (56)

General case (without compensator):
Critical phase adaptation in (26)
Critical phase adaptation in (56)

DEVICE AND METHOD FOR CONVERTING AN OPTICAL FREQUENCY

The invention concerns a device for optical frequency conversion 1, a method for optical frequency conversion, and the use of a double refracting crystal to optimize an optical frequency conversion in at least one optically non-linear medium.

The optically non-linear frequency conversion of laser beams is a known process for generating from laser light of frequency ω, laser light with a different frequency. Examples of optically non-linear frequency conversion are three-wave mixed processes such as sum frequency mixing (SFM), frequency doubling (SHG), difference frequency generation (DFG) and optically parametric oscillation (OPO). The medium in which the frequency conversion takes place is usually an optically non-linear crystal. One important parameter in all optically non-linear processes is the transformation rate (efficiency). The transformation rate indicates how much of the beam power irradiated into the optically non-linear crystal is transformed by the optically non-linear process into the beam power of the frequency-converted beam. Usually as high as possible a transformation rate is desired. In order to achieve a higher transformation rate with the optically non-linear method, a good spatial overlap of the interacting beams in the non-linear medium is necessary. If the laser beam consists of light pulses, the transformation rate is affected not only by the spatial overlap but also by the temporal overlap of the interacting light pulses. Only if the pulses pass through the optically non-linear crystal at the same time is there optimum interaction. This should be noted in particular for ultra-short laser pulses. Ultra-short pulses are pulses with a duration of typically less than 100 ps and preferably less than 10 ps. The short duration of these pulses leads to the temporal overlap of the interacting pulses often being reduced, as for example only a part (e.g. the front flank) of the pulse of the one beam overlaps with a part (e.g. the back flank) of the pulse of the other beam. This gives a temporal overlap which is less than a temporal overlap arising if the pulse maxima reach the same place in the crystal at the same time and move through this with the same speed. With such a complete temporal pulse overlap the transformation rate is usually maximum.

A temporal delay in pulses in an optically non-linear crystal arises from the dependency of the refractive index on the wavelength (dispersion). If two ultra-short pulses of different wavelength pass through a dispersive medium, the pulses are moved apart temporally. The decisive physical parameter for the propagation speed is the group speed. This can be calculated from the refractive index (n) and the change in refractive index with wavelength (λ). The different group speeds of laser pulses with different wavelength and/or polarisation lead to a different temporal delay in comparison with propagation in a vacuum and hence may lead to a non-optimum temporal overlap of the pulses in the non-linear crystal, whereby the non-linear interaction between the pulses is reduced and hence the transformation rate reduced. To calculate the temporal delay of ultra-short pulses, the decisive factor is not calculation of the delay via the difference in optical paths (n.L) but the distance L which must be travelled at group speed $v_{gr}$ of the light pulse. The group speeds are calculated using the dispersion formulae with the relation:

$$v_{gr,0} = \left(\frac{n_0}{c} - \frac{\lambda}{c}\frac{\partial n_0}{\partial \lambda}\right)^{-1}$$

for the ordinary refractive indices and via the equation $$v_{gr,e} = \left(\frac{n_e(\theta)}{c} - \frac{\lambda}{c}n_e(\theta)^3\left(\frac{\cos^2\theta}{n_o^3}\frac{\partial n_0}{\partial \lambda} + \frac{\sin^2\theta}{n_e^3}\frac{\partial n_e}{\partial \lambda}\right)\right)^{-1}$$

for the extraordinary refractive indices. $n_0$ and $n_e$ are the ordinary and extraordinary refractive indices for wavelength λ, $n_e(2)$ is the extraordinary refractive index which depends on angle θ between the optical axis of the crystal and the propagation direction of laser beam.

$$\frac{\partial n_o}{\partial \lambda} \text{ and } \frac{\partial n_e}{\partial \lambda}$$

are the derivatives of the ordinary and extraordinary refractive indices by wavelength, and c is the light speed.

In the frequency conversion, the phase adaptation condition must be fulfilled for efficient generation. The phase adaptation condition corresponds to the pulse obtained for the non-linear method. The phase adaptation condition can for example by fulfilled in double refracting crystals. The phase adaptation condition is $\Delta k = k_3 - k_1 - k_2 = 0$, i.e. the wave vectors $k_1$ and $k_2$ of the irradiated waves and wave vector $k_3$ of the generated waves must add up to zero.

In double refracting crystals, the refractive index and hence the length of the wave vector is dependent on the angle of the propagation direction of the irradiated light to the optical axis. By irradiating laser light with a suitably set angle to the optical axis, the phase adaptation condition can be fulfilled. In general by irradiating the laser light with an angle to the optical axis, a walk-off is generated. The walk-off arises from the difference in the direction of the wave vector k (as the normal vector on the wave front) to the direction of the energy flow which is described by the Poynting vector. The walk-off angle ρ is calculated as:

$$\rho = \pm \arctan\left[\left(\frac{n_0}{n_e}\right)^2 \cdot \tan\theta\right] \mp \theta$$

The upper prefix in the formula is valid for negative crystals for which $n_0 > n_e$. The lower prefix in the formula is valid for positive crystals for $n_e > n_0$. Negative and positive crystals here does not refer only to uniaxial crystals. The formula is also valid for calculating the walk-off angle for biaxial crystals if the propagation takes place in the main planes of the biaxial crystals.

For optically non-linear frequency conversion, usually optically non-linear crystals with double refraction are used. A further class of optically non-linear crystals are crystals with quasi phase adaptation in which the non-linear susceptibility is modulated periodically. In a double refracting crystal the propagation speed of the pulse is dependent on the wavelength and polarisation of the beam. In this way run time differences occur between pulses of different polarisation even if they have the same wavelength.

On frequency conversion in non-linear crystals with ultra-short laser pulses, consequently in general the walk-off leads to a spatial and the run time difference to a temporal offset of the pulses which leads to a non-optimum overlap of pulses so the conversion efficiency is reduced.

An improvement in the spatial and temporal overlap is therefore of essential significance for frequency conversion. Therefore it is important to compensate for the spatial walk-off and the run time differences by a suitable method in order to improve the spatial and temporal overlap simultaneously.

This is particularly important for non-linear frequency conversion processes which comprise several successive non-linear conversion processes. Examples are frequency tripling in which the frequency-doubled beam is generated by a first non-linear crystal and then in a second non-linear crystal the third harmonic is generated as the sum of frequency-doubled and fundamental laser beams. A further example is the generation of the fifth harmonic of the laser beam in which for example, after the frequency tripling in a further non-linear crystal, the fifth harmonic of the fundamental laser beam is generated by sum frequency generation of the tripled beam with the frequency-doubled beam.

For the frequency conversion in an optically non-linear crystal of two laser beams which are each polarised linear but orthogonal to each other, for frequency conversion with type II phase adaptation one of the two beams passes through the crystal as an ordinary wave and the other beam passes through the crystal as an extraordinary wave. Because of the different refractive indices and dispersion for ordinary and extraordinary beams, the group speed for the two beams differs. The result is a temporal offset of pulses which changes during passage through the crystal. In addition the walk-off of the extraordinary beam leads to a spatial offset of the extraordinary beam relative to the ordinary beam. Both the run time differences and the walk-off usually lead to a reduction in conversion efficiency.

THE STATE OF THE ART

The literature discloses various methods to compensate for the spatial walk-off in frequency conversion. Publication U.S. Pat. No. 5,047,668 ("Optical walk-off compensation in critically phase-matched three-wave frequency conversion systems", Bosenberg) specifies a method in which a pair of optically non-linear crystals for frequency conversion are arranged so that the orientation of their optical axes relative to the radiation axis is reversed. This compensates for the spatial separation of ordinary and extraordinary beams from the walk-off of the extraordinary beam in the first crystal by the equivalent merging of both beams from the walk-off in the reverse-orientated second crystal. The result is overall an improved spatial overlap of the beams and hence a higher conversion efficiency. This method has several disadvantages. Two crystals are necessary, both of which must be precisely controlled to maintain the phase adaptation condition in the angle of the optical axis to the propagation direction of the laser beam. This is a requirement which in practice can only be achieved at very high cost, since the necessary precision of the angle adjustment in critically phase-adapted frequency conversion processes is typically less than 0.1 degree and also in the optimum configuration two crystals must be set with this precision.

Furthermore in this state of the art compensation for the spatial walk-off is not complete. To further increase the spatial overlap of the beams involved, more than two optically non-linear crystals of the same type must be arranged in periodically successive reverse orientation.

This is described in the publication "Increased Acceptance Bandwidths in Optical Frequency Conversion by Use of Multiple Walk-off-compensating Non-linear Crystals", A. V. Smith et al., (J. Opt. Soc. Am. B., vol 15, pp 122-141, 1998). The practicability of such an arrangement is low as the phase adaptation condition must be maintained for all crystals. Therefore each individual crystal must be precisely adjusted in its spatial position and held in this position irrespective of environmental influences. Also in such an arrangement the optical losses increase even if anti-reflection coatings are applied to the crystal facets. By reflection and absorption losses, in a multiplicity of crystals the efficiency can even be reduced in comparison with a two-crystal arrangement. The disadvantage is furthermore that the newly generated beam must run through all surfaces. In particular for the production of ultra-violet (UV) light at high power, problems can arise in respect of interference and hence the life of the surfaces of the non-linear crystals. The known processes for use of prisms or prism-like chamfered crystal ends to separate the UV beam from the remaining laser beam and hence to avoid UV-resistant anti-reflection coatings on the crystal facets, cannot be applied here. A further serious disadvantage of arrangements of $2^n$ frequency conversion crystals ($n \geq 1$) is the increased cost. The costs of optically non-linear crystals are above all the costs for machining and coating the surfaces i.e. for optical polishing and anti-reflection coating of the inlet and outlet surfaces.

In the device according to the said U.S. Pat. No. 5,047,668 (Bosenberg) there is no compensation for run time differences which arise for pulsed laser beams. The crystals are oriented so that the phase adaptation condition for frequency conversion is fulfilled. For this crystal orientation, the dispersion will generally lead to a difference in group speeds of two pulses of different wavelengths and/or polarisation, so that because of the run time differences of the pulses in the crystals the conversion efficiency is reduced. U.S. Pat. No. 5,047,668 (Bosenberg) contains no teaching on how to set the run times in order to influence and compensate for the run time differences of laser pulses in a targeted manner.

EP 0503875A2 ("Poynting vector walk-off compensation in type II phase matching", Nightingale) describes a further method for compensation for spatial walk-off in optically non-linear crystals. The angle between the Poynting vectors of the beams concerned is compensated in the crystal in that the beams are not irradiated into the crystal perpendicular to the surface. By irradiating the laser light at an angle, the beams are broken on the inlet facet of the crystal, the direction of the wave vectors thus changed. For collinear light beams which differ in polarisation and/or wavelength, an angle then arises between the wave vectors in the crystal which, with suitable choices angle of incidence and orientation of the crystal axes in relation to the inlet facet of the crystal, compensate for the walk-off angle between the Poynting vectors. Compensation of the spatial walk-off here takes place over the entire crystal length. It is advantageous that only one optically non-linear crystal need be used. This method however has disadvantages. For a particular frequency conversion process, the irradiation angle and orientation of the optical axis of the crystals must be specially adapted. These angles are determined by the wavelength and polarisation of the irradiated light beams and the refractive indices of the crystal for these light beams. For this EP 0503875A2 (Nightingale) gives a calculation specification. It is shown however that this condition cannot always be fulfilled. In particular to compensate for greater walk-off angles, the crystal for the light beams must have a large double refraction in order to be able to achieve a double refraction angle which is equal to the walk-off angle. The process of the non-perpendicular irradiation to compensate for walk-off is therefore preferred for small walk-off angles. For frequency doubling in type II phase-adapted KTP with a walk-off angle of 0.2°, Nightingale specifies an angle of incidence of 7.34°. For the sum frequency mixing of a 1064 nm laser beam with a frequency-doubled 532 nm beam in type II phase-adapted LBO to generate UV radiation with a wavelength of 355 nm, for the corresponding walk-off angle of 0.5°, an angle of incidence of 27° is calculated to compensate for this walk-off in the crystal. A further disadvantage is that for frequency doubling with this method, compensation for walk-off is possible only in crystals with type II phase adaptation. The disadvantage is also that due to the non-perpendicular irradiation, the beams in the non-linear crystal undergo a change in beam cross section. The beam becomes astigmatic whereby a reduction in the common overlap occurs. To compensate for the astigmatism, before entry into the non-linear crystal the beams must be suitably formed. For this known methods are available such as the use of cylinder optics or spherical resonator mirrors with non-perpendicular incidence, which however all entail an increased cost.

As the arrangement with the non-perpendicular incidence compensates only for the spatial walk-off, pulses with different polarisation and/or wavelength must be shifted temporally in relation to each other during passage through the optically non-linear crystal. There is no compensation for run time differences and the method given i.e. the non-perpendicular irradiation into the crystal, cannot achieve this.

Arrangements to generate higher harmonics of laser light with improved spatial overlap are disclosed in publications U.S. Pat. No. 5,835,513 ("Q-switched laser system providing UV light", Pieterse et al.) and U.S. Pat. No. 5,848,079 ("Laser with frequency multiplication", Kortz et al.). In both publications, two optically non-linear crystals are arranged in succession. The first non-linear crystal is a crystal to generate the second harmonic, the second non-linear crystal serves as a frequency multiplier. The common factor in both publications is that the first non-linear crystal (frequency-doubling crystal) is cut for critical phase adaptation. Thus in this non-linear crystal a walk-off occurs between the fundamental laser wave and the second harmonic. The walk-off angle is given in U.S. Pat. No. 5,848,079 (Kortz) as 0.1° to 6°. In U.S. Pat. No. 5,835,513 (Pieterse) no value is given for the walk-off angle but the cut angle of the frequency doubler crystal LBO should be between 5° and 10° for the crystal angle phi and between 85° and 90° for the crystal angle theta. The person skilled in the art can calculate the walk-off angle from this information.

The walk-off in the frequency doubler crystal spatially separates the beams of the fundamental laser wave and the second harmonic. This spatial separation of the fundamental and the harmonic, with an appropriate arrangement of the second optically non-linear crystal, causes an improved spatial overlap therein. The improved spatial overlap leads to an increase in conversion efficiency to generate the third harmonic in this second non-linear crystal. The disadvantage in the teaching of U.S. Pat. No. 5,835,513 (Pieterse) and U.S. Pat. No. 5,848,079 (Kortz) is that for frequency doubling using the first non-linear crystal, an optically non-linear crystal with critical phase adaptation must be used, since a walk-off can only be generated in this frequency doubler with critical phase adaptation. The critical phase adaptation however has the disadvantage that the conversion efficiency is generally less in comparison with a non-critical phase adaptation without walk-off. The frequency doubling according to U.S. Pat. No. 5,835,513 (Pieterse) and U.S. Pat. No. 5,848,079 (Kortz) will therefore generate a lower power of the second harmonic, whereby then the conversion efficiency in this second non-linear crystal is also lower. A further disadvantage is that the crystal lengths of the frequency doubler and the second non-linear crystal cannot be selected independently of each other in this method as a specific spatial separation is required between the fundamental wave and the generated second harmonic after the doubler crystal which must be adapted to the walk-off in the second non-linear crystal and its length. The crystal length of the doubler crystal should be selected accordingly so that the walk-off in the second non-linear crystal is compensated. Only then will there be a sunstantially improved spatial overlap in the second non-linear crystal. The crystal length of the doubler crystal is however then not optimised for frequency doubling so that where applicable the conversion efficiency for the second harmonic is unsatisfactory. To optimise the conversion efficiency for the second harmonic and for the generated sum frequency however an independent adaptation and hence optimisation of the length of the two crystals is required.

According to the devices described in U.S. Pat. No. 5,835,513 (Pieterse) and U.S. Pat. No. 5,848,079 (Kortz), run time differences in the crystals for pulsed laser radiation are not influenced in a targeted manner. The crystals are selected only by fulfilment of the phase adaptation condition for the frequency conversion and the spatial overlap of the beams in the second non-linear crystal being improved by the walk-off generated in the first crystal. For crystal orientations to be set for phase adaptation in the first and second crystal, the corresponding dispersion would usually lead to a difference in the group speed for pulsed beams so that because of the associated run time differences, the temporal overlap of the light pulses in the crystals is not optimum and hence the conversion efficiency is reduced.

The devices described in the said publications have in common the fact that the walk-off is only reduced so the spatial overlap of the beams is improved for an efficient frequency conversion. No teaching is disclosed to compensate for run time differences or the targeted change of temporal spacing between laser pulses which leads to an improvement in temporal overlap and hence an increase in the conversion efficiency for pulsed laser beams.

U.S. Pat. No. 5,852,620 ("Tunable time plate", Chaozhi Wan) describes an arrangement with which a continuous temporal delay can be set between two pulsed laser beams of pico-and femto-second duration. This comprises one or more double refracting crystals which are supported rotatably. By rotating the crystal about a particular axis, the angle of incidence of the pulses relative to the optical axis changes. This changes the refractive index and the dispersion. This leads to a change in run time of the pulses through the crystal. The spatial walk-off between the beams is not influenced in a targeted manner in this process, so the conversion efficiency is reduced because of the walk-off. This publication gives no information on the spatial walk-off associated with the selected irradiation direction. No teaching is given in this publication on compensation for the spatial walk-off and the improvement in conversion efficiency which can be achieved in this way.

OBJECT

The object of the invention is to increase the conversion efficiency in optically non-linear frequency conversion in which at least two pulsed laser beams are irradiated into an optically non-linear medium, in particular an optically non-linear crystal, with simple means.

According to the invention, to increase the conversion efficiency of optically non-linear conversion processes in which two pulsed laser beams are irradiated into an optically non-linear medium e.g. a crystal, a double refracting crystal is arranged before this optically non-linear medium. This double refracting crystal, referred to below as a compensator, has the property of improving both the spatial and the temporal overlap of the light pulses irradiated into the non-linear crystal. This is achieved by a suitable orientation of the optical axis of the compensator to the propagation direction of the laser pulses and a suitable compensator length. With the compensator the conversion efficiency of the optically non-linear frequency conversion method is increased in comparison with the conversion efficiency without compensator. The compensator according to the invention gives the pulses in the two laser beams a temporal offset so that the pulses of the two beams can reach preferably the centre of the frequency conversion medium (e.g. crystal) at the same time. The compensator in this case must compensate for the temporal offset, which arises between the pulses when passing through half the length of the frequency conversion medium because of the different group speeds, and also compensate for the temporal offset of the two pulses which they would have without a compensator according to the invention at the inlet facet of the frequency conversion medium. The compensator according to the invention must also have the property that it compensates for the spatial separation of the pulses via the spatial walk-off in the frequency conversion medium. For this after passing through the compensator the light pulses must be offset spatially by a distance which preferably corresponds to half the spatial offset of the two beams after passing through the frequency conversion crystal. The compensator must be arranged so that the direction of the spatial offset in the compensator is opposite the direction of the spatial offset in the frequency conversion crystal.

The length of the compensator and orientation of the optical axis of the compensator to the propagation direction of the laser beams are determined by calculating the optical paths and the spatial separation of the pulses which are irradiated into the compensator as ordinary and extraordinary beams. The run times through the crystals and the compensator are calculated via the group speeds of the light pulses and the run distances using the refractive indices and dispersion data. The same applies to the run times in all optical elements through which the beams pass. The spatial separation caused by the walk-off is calculated using the refractive indices and dispersion data of the optically non-linear crystals and compensator. The compensator is thus designed so that the pulses irradiated into the compensator leave this with a certain spatial and temporal interval. The prespecified spatial and temporal interval must be set at the same time by a suitable choice of crystal length and orientation of the optical crystal axis to the propagation direction of the laser beams.

The particular advantage of this preferred embodiment of the invention is that with a single element, the compensator, the temporal and spatial offsets of the light pulses can be influenced simultaneously in a targeted manner in the subsequent optically non-linear conversion crystal or crystals, and adjusted with a view to improved conversion efficiency.

A further advantage of the invention is the fact that for two successive non-linear processes the conversion efficiency for both single processes can be optimised separately as the possible spatial and temporal offset via the first conversion process can be influenced by the compensator such that the resulting spatial and temporal offset gives an improved efficiency for the second conversion process. A further advantage is that only one crystal is required for compensation. This does not participate in the optically non-linear conversion process itself and is also positioned in front of the conversion crystal. This is particularly advantageous if the conversion generates short-wave radiation in the conversion crystal. The compensator through which the short wave radiation does not pass must therefore be transparent only for the irradiated beams with longer wavelengths. This gives a wider selection of materials for the compensator. This is advantageous also in relation to the facets of the compensator through which the laser beams pass, as any anti-reflection coatings applied there also need not be designed for short-wave radiation.

The freedom of choice of material for the compensator is all the larger as the compensator itself does not participate in the optically non-linear process and hence is subject to no restrictions with regard to crystal orientation necessary for phase adaptation. A further advantage is that the compensation can also be carried out in optically non-linear processes with a large spatial walk-off. There is no restriction from the possible refraction of the beams on the surface of the conversion crystal and the associated change in propagation direction.

It is further advantageous that the compensator need not be introduced in areas of focussed beams but a position can be selected at which the focal points of the beams are comparatively large. As a result the power densities are relatively low, so the load on the compensator from the laser beam is far removed from its breaking limit. This reduces the danger of destruction of the crystal from high laser power.

A further advantage is the low adjustment sensitivity of the compensator. The angle setting in comparison with a crystal with phase adaptation has a great tolerance. Therefore only a simple holder device is required for the compensator, which reduces the equipment cost accordingly.

It is also advantageous that the beams can strike the facets of the compensator and subsequent non-linear crystal perpendicular. This avoids the astigmatism which arises with non-perpendicular incidence. Thus no devices are required to compensate for astigmatism, which further reduces the equipment cost.

Figure 2:
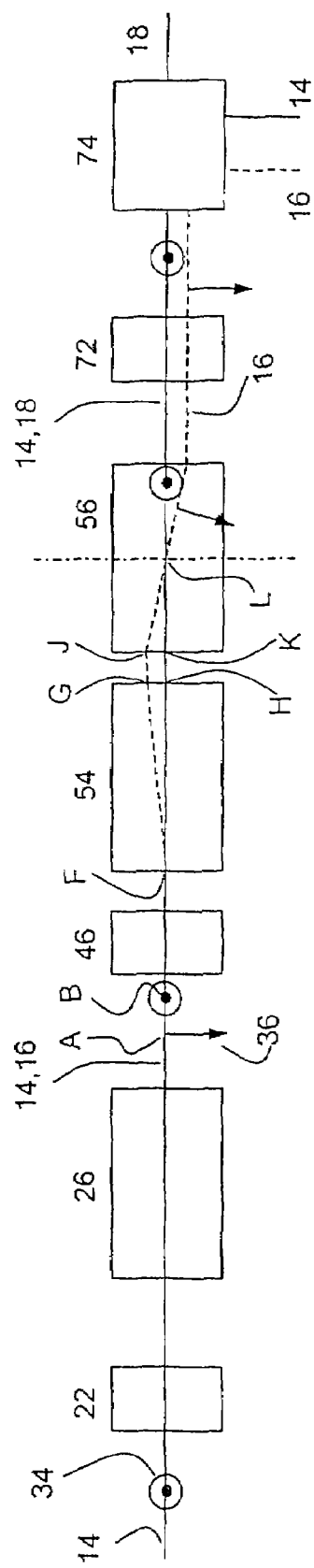
Figure 3:
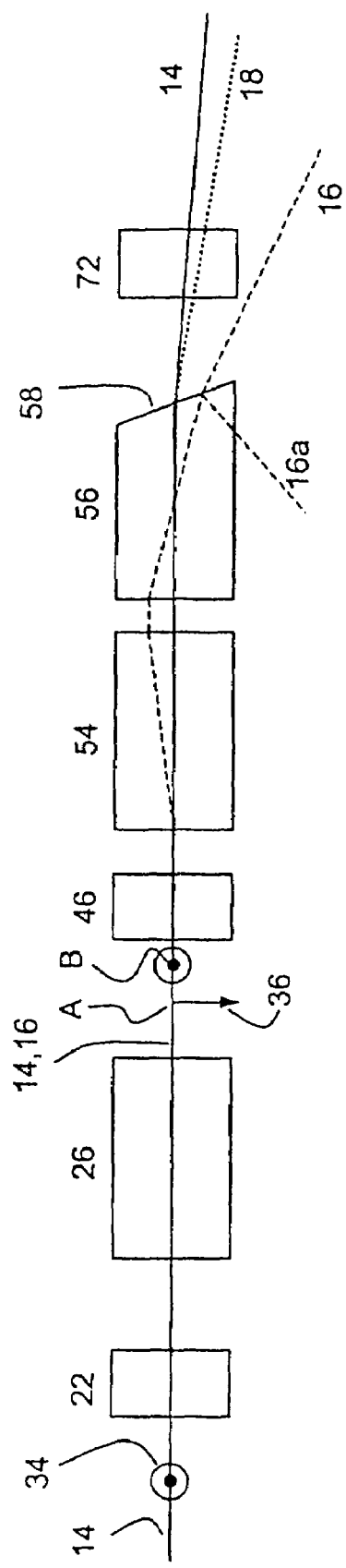
Figure 4:
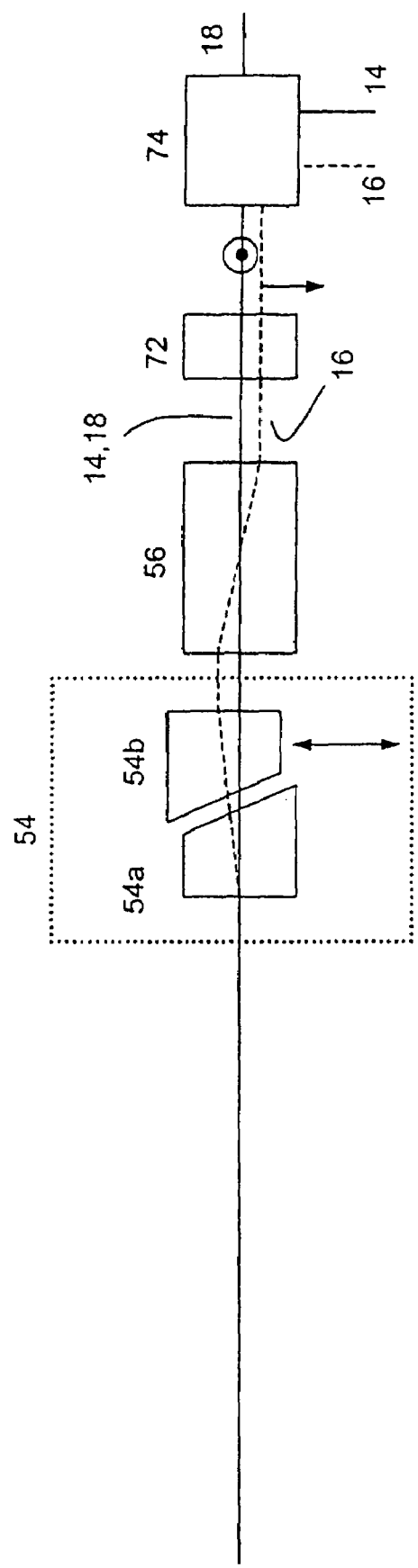
Figure 5:
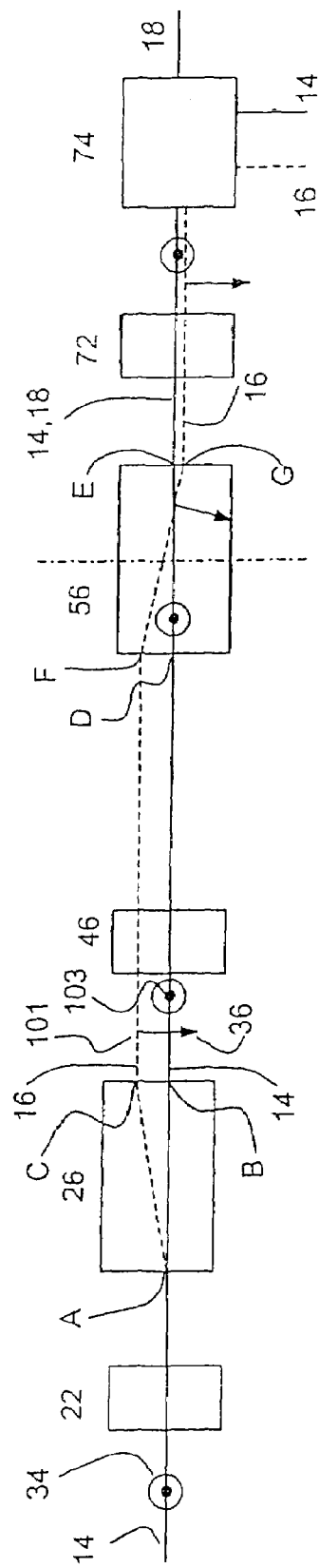

The device according to the invention is now explained with reference to the following embodiment examples. The drawings show FIG. 1: A device for frequency doubling with non-critical phase adaptation and subsequent phase tripling with type II phase adaptation;

FIG. 2: A device for frequency doubling with non-critical phase adaptation and subsequent phase tripling with compensator according to the invention before the non-linear crystal for frequency tripling;

FIG. 3: A device for frequency tripling with compensator according to the invention and non-linear crystal for frequency tripling with angled outlet facet;

FIG. 4: A device for frequency conversion with a split compensator;

FIG. 5: A device for frequency conversion with critical phase adaptation and subsequent frequency conversion with type II phase adaptation, and FIG. 6: A device for a frequency conversion with critical phase adaptation and compensator according to the invention before the non-linear crystal for frequency conversion with type II phase adaptation.

FIG. 1 shows an arrangement as is normally used for frequency tripling. It comprises an arrangement for non-critical frequency doubling and an arrangement for sum frequency mixing of fundamental and frequency-doubled radiation. This arrangement contains a crystal (26) for frequency doubling and a crystal (56) for frequency tripling. The laser beam (14) has a linear polarisation (34). Using the optical device (22) the laser beam (14) is irradiated into the frequency doubler crystal (26). The optical device (22) irradiates such that a focus is formed in the crystal (26) to increase the power density of the laser beam (14). The polarisation of the laser beam (14) is linear, the vector of the electrical field is perpendicular to the plane of the diagram (1). The non-doubled beam (14) and the frequency-doubled beam (16) leave the frequency doubler crystal (26). The frequency-doubled beam (16) has a polarisation direction (36) which is orthogonal to the polarisation direction (34) of the laser beam (14). If the frequency doubling using the frequency doubler crystal (26) is non-critical, the laser beam (14) and the frequency-doubled beam (16) are collinear. Because of the dispersion in the crystal (26), the group speeds of the two beams in the crystal (26) are different. For pulsed laser radiation this gives a temporal offset between the pulses of the laser beam (14) and the pulses of the frequency-doubled beam (16). The temporal offset is characterised by points A and B. The pulse of the laser beam at a given time is at point B, the associated frequency-doubled pulse in contrast is only at point A. The temporal order of the pulses can also be reversed if the dispersion of the frequency doubler crystal is such that the group speed of the frequency-doubled beam (16) is greater than the group speed of the beam (14). The important factor is not the order but the difference in group speeds for laser and frequency-doubled pulses which leads to a temporal offset Δt of the pulses so that after the frequency doubler crystal the pulses are not at the same point at a given time.

Using the optical device (46) the laser pulses (14) and the frequency-doubled pulses (16) are irradiated into the sum frequency mixed crystal (56) to generate the third harmonic. Because of the walk-off of the frequency-doubled beam, this leaves the tripler crystal at point E. The fundamental beam which undergoes no walk-off leaves the tripler crystal at point D. The third harmonic (18) also leaves the tripler crystal at point D. The frequency-doubled beam (16) runs along line CE, the fundamental beam along line CD. The optical device (72) focuses and forms the beam (18). This can be a lens, a lens system or a system of reflective optics. Using the separator (74), the beams (14), (16) and (18) are separated. For this a wavelength-dependent and/or polarisation-dependent selection of the beams is made with known optical elements. These are in particular coated mirrors, prisms or polarisers. A combination of these elements for beam separation is also possible.

The group speeds of the laser pulses (14) and the pulses of the frequency-doubled beam (16) are different in the non-linear crystal (26) and the focussing element (46). For this reason pulses (14) and (16) reach the non-linear crystal (56) at point C of the facet at different times.

Because of the walk-off between the beams (14) and (16) in the crystal (56), for beam diameters and crystal lengths common in practice the spatial overlap of these beams while passing through the crystal is limited to a fraction of the crystal length.

Due to the reduced temporal and spatial overlap the conversion efficiency for generating the third harmonic in the crystal (56) is greatly reduced.

The device according to the invention substantially improves the temporal and spatial overlap. As a result the conversion efficiency is improved. As the embodiment example described below shows, a device according to the invention can more than double the conversion efficiency.

The device according to the invention will be described using the structure of FIG. 2.

In the beam path between the frequency doubler (26) and the frequency tripler (56) is inserted the compensator (54) according to the invention. The laser beam (14) runs via path F, H, K, L. The frequency-doubled beam runs via path F, G, J, L. The two beams meet preferably in the centre of the tripler crystal (56). The direction of the walk-off in the compensator is set so that it is opposite the direction of the walk-off in the tripler crystal. This enlarges the spatial overlap in the tripler crystal.

The spatial offset HG between the laser beam and the frequency-doubled laser beam is given by:

$$HG = \tan(\rho_{komp}) \cdot L_{komp}$$

Here $\rho_{komp}$ is the walk-off angle of the extraordinary beam in the compensator and $L_{komp}$ the length of the compensator.

This offset is set so that distance JK on the facet of the tripler crystal preferably corresponds to half the distance DE (FIG. 1). Distance HG is equal to distance JK when the facets of the compensator (54) and frequency conversion crystal (56) are perpendicular to the laser beam direction. To adjust the offset, the walk-off in the compensator and the length of the compensator crystal are selected suitably. The walk-off angle is determined by the choice of propagation direction of the laser beam (14) relative to the optical crystal axis of the compensator (54).

The orientation of the optical axis of the compensator and its length are also selected so that the run time differences of the laser pulses and the pulses of the frequency-doubled beam in crystal (26) are compensated in the focussing element (46) and in the tripler crystal (56) (on paths KL and JL). Thus the pulses of beams (14) and (16) reach point L at the same time. For this the group speed of the frequency-doubled pulses in the compensator must be greater than the group speed of the pulses of the laser beam in the compensator as the frequency-doubled beam has a longer path and has already undergone a temporal delay in relation to the laser beam due to the frequency doubling.

By arranging a compensator before the crystal (56), firstly distance KJ is set so that the beams physically meet at point L. At the same time the temporal interval of the pulses of the two beams is set so they reach point L at the same time. The compensator thus generates an improved spatial and temporal overlap in the tripler crystal.

With the length of the compensator and the orientation of its crystal axis to the propagation direction of the laser beams, two parameters are available which can be selected so that the said spatial and temporal conditions for improved beam overlap are fulfilled simultaneously.

A further embodiment of the device according to the invention is shown diagrammatically in FIG. 3. In all figures components with the same or similar function have the same reference numerals so a repeated description can be omitted.

In this embodiment the outlet facet (58) of the non-linear frequency conversion crystal (56) is designed so that the beams (14), (16) and (18) leave the crystal in different directions. Then the beam separation device (74) can be omitted. If the outlet facet (58) for the beam (18) is cut at the Brewster angle, the beam leaves the crystal loss-free. For this the Brewster angle must be calculated for the polarisation and wavelength of the beam (18).

A further embodiment is shown diagrammatically in FIG. 4.

In FIG. 4 to the left of the compensator should be added the corresponding components according to FIG. 3 or 2. The compensator (54) is divided into two halves (54a) and (54b). The outlet side of the part compensator (54a) is cut at an angle to the beam direction. The inlet side of the part compensator (54b) has the same cut angle. The two part compensators are oriented in relation to each other so that they would act as a compensator if the outlet side of part compensator (54a) and the inlet side of part compensator (54b) were placed against each other. If one of the two part compensators is firmly attached in the beam path and the other part compensator is moved in the direction perpendicular to the beam path, the temporal compensation can be continuously adjusted as the paths for the beams are changed continuously. The spatial beam offset generated by the compensator (54) is not changed as a result. In order to obtain the same spatial offset of a single compensator (54) using two part compensators (54a) and (54b), the refraction of the beam (16) at the outlet side of the part compensator (54a) and the inlet side of the part compensator (54b) must be taken into account as due to the refraction an additional spatial offset occurs. This depends on the cut angle of the part compensators and the spacing of the part compensators, and can easily be calculated.

FIG. 5 (still without compensator) shows a case of frequency conversion in which a walk-off is already present in the first non-linear crystal (26). This walk-off occurs for example on frequency conversion with critical phase adaptation. After passing through the crystal (26), the beams are separated by distance BC. The pulses of beams (14) and (16) are also temporally separated as at a given time the pulses in beam (14) are at point (103) and those of beam (16) have only reached point (101). The beams enter the second non-linear crystal (56) with temporal offset at points D (beam (14)) and F (beam (16)). The walk-off in crystal (56) leads to a deflection of the beam (16) so that this leaves the crystal (56) at point G. For this case too the compensator according to the invention compensates for the spatial and temporal offset of the pulses. This is shown in FIG. 6.

The favourable effect of the compensator is not restricted to a frequency conversion with type II phase adaptation after the compensator. If the subsequent frequency conversion takes place with type I phase adaptation, between the compensator (54) and frequency conversion crystal (56) is inserted a half-wave plate for one of the two laser beams entering the conversion crystal. This rotates the polarisation direction of this beam through 90°, while the polarisation direction of the other laser beam entering the conversion crystal remains unchanged. Thus the two laser beams in the conversion crystal (56) are polarised in the same direction.

Figure 6:
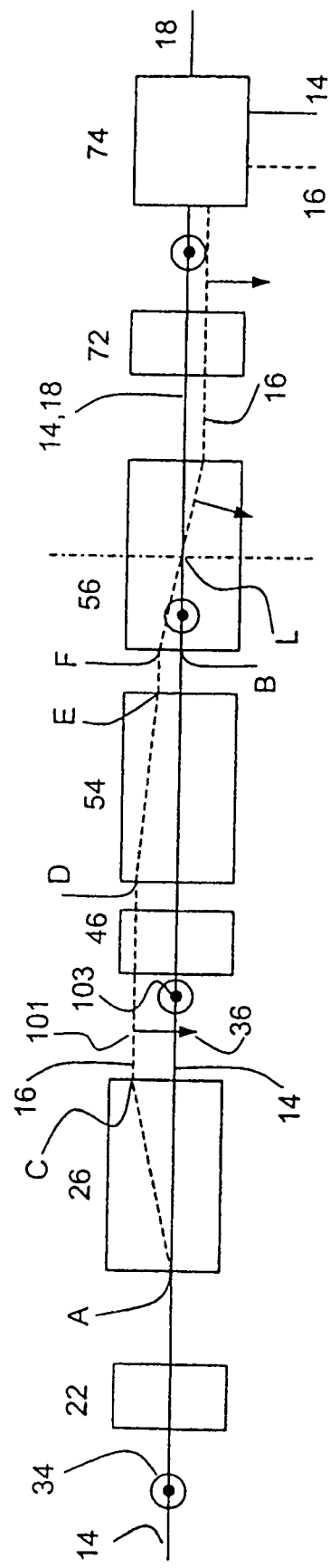

As is clear from FIG. 6, the compensator must be designed in length and cut angle so that the pulses of beams (14) and (16) meet preferably in the centre of the non-linear crystal (56) at the same time.

The advantages of the method according to the invention and the corresponding device are shown by the following embodiment example. This concerns a frequency tripling of a mode-coupled Nd:YVO$_4$ ultra-short pulse laser.

EMBODIMENT EXAMPLE

Frequency Tripling of a Mode-Coupled Nd:YVO$_4$ Laser

To generate the third harmonic of a mode-coupled ND:YVO$_4$ laser with a fundamental wavelength of 1064 nm, the frequency-doubled radiation with a wavelength of 532 nm is generated in lithium triborate (LBO). The frequency doubling is of type I, i.e. the polarisation of the generated second harmonic is perpendicular to the polarisation of the fundamental wave. The LBO crystal has a x-cut, i.e. the y and z main axes of the crystal are oriented perpendicular to the beam direction. The LBO is operated at a temperature of around 150° C., where the frequency doubling is non-critical without a spatial walk-off between the fundamental wave and the frequency-doubled wave. The two beams run collinear in the LBO crystal and after emerging from the LBO crystal. The group speeds of the 1064 nm pulse and the 532 nm pulse are different in the LBO crystal because of dispersion. This gives a temporal offset between two pulses which can be calculated using the known dispersion data of LBO. For the non-critical frequency doubling there is a delay of 44 fs per mm crystal length. After the frequency doubler, with an LBO crystal length of 15 mm, the pulses are temporally offset to each other by 660 fs. As the group speed of the 1064 nm pulse is greater than that of the 532 nm pulse, the 532 nm pulse is delayed by 660 fs in relation to the 1064 nm pulse.

For frequency tripling, after the frequency doubler crystal an LBO crystal with critical phase adaptation is used: the crystal has the cut angle phi=90° and theta=42.5° for a crystal temperature of 25° C. The fundamental beam and the third harmonic are ordinarily polarised for this crystal orientation, the frequency-doubled radiation is extraordinarily polarised. For this critical phase adaptation there is a spatial walk-off between the beams irradiated into the frequency tripler crystal. The walk-off between the 1064 nm beam and the 532 nm beam is $\rho$=9.3 mrad (0.53°). The beams entering the tripler crystal collinear will after the LBO crystal have a spatial offset of tan($\rho$).L. The spatial offset for the tripler crystal of length L=15 mm is 139 μm.

The group speed difference of the two pulses in the LBO tripler crystal is 219 fs/mm. For a 15 mm long crystal, the pulses have a temporal offset of 3.3 ps. Thus the 532 nm pulse, because of the lower group speed, will be delayed in relation to the 1064 nm pulse. For doubling and tripling, focussing in the non-linear crystal is required. The focus is selected so that it lies in the centre of the crystal concerned. In the focus of the tripler crystal the pulses therefore have a temporal offset of 3.3/2=1.65 ps. For tripling, the overlap of the pulses and hence the conversion efficiency is greatest if the pulses reach the focus at the same time. Therefore in total a temporal compensation must be created which corresponds to the sum of the temporal offset on passing through the doubling crystal and the temporal offset on passing through half the crystal length of the tripler crystal. The temporal offset from the optical device (46) is negligible in this embodiment example because of the low offset. In total thus a temporal offset of 2.31 ps must be compensated.

To compensate for the spatial walk-off and temporal offset, according to the invention as a compensator a double refracting BBO crystal is positioned before the tripler crystal. The BBO has anti-reflective coated surfaces which minimise the losses for 1064 nm and 532 nm. In accordance with the statements for the compensator, for the BBO crystal a cut angle is achieved of 86.35°. The crystal must then have a length of 8 mm.

The mode-coupled Nd:YVO$_4$ laser has a pulse length of 9 ps and a mean power of 18 W for a wavelength of 1064 nm. When the compensator is used a third harmonic power is generated of 4 W at 355 nm. If the compensator is not used the power is just 1.5 W. The conversion efficiency is thus more than doubled by the compensator.

If the compensator has a crystal angle of 90° and is introduced perpendicular into the beam path, with this compensator only the temporal offset can be compensated since for this crystal orientation there is no spatial walk-off in the compensator. If such a crystal is used as a compensator in frequency tripling, the power of the third harmonic is 2.2 W. It is as expected higher than the power without compensator but lower than the power with the compensator which compensates for both the temporal and the spatial offset.

For compensation not only BBO can be used. Examples of other suitable double refracting crystals are KDP, YVO$_4$, BiBO$_3$ and quartz. E.g. for the embodiment example of frequency tripling with a compensator of KDP, there is an angle of 86.8° and a length of 23.2 nm. The said crystals are not the only ones possible, the person skilled in the art using the calculation specifications given can easily calculate the necessary orientation angle and length of the crystal concerned also for other double refracting crystals.

The invention claimed is:

1. A device for optical frequency conversion of at least two laser beams (14, 16) of ultra-short beam pulses which have a temporal offset and a spatial walk-off, with at least one optically non-linear medium (56), said ultra-short pulses having a duration of less than 100 ps, comprising: in the beam path before the optically non-linear medium (56) is arranged a double refracting crystal (54), the length of the double refracting crystal and the optical crystal axis of the double refracting crystal with respect to the propagation direction of the laser beam are set such that the change caused by the double refracting crystal (54) in the location and time of incidence of the beam pulses (14, 16) on the optically non-linear medium (56), the direction of the walk-off in the double refracting crystal (54) being opposite the direction of the walk-off in the optically non-linear medium (56), and the resulting change in the spatial and temporal overlap of the beam pulses in the optically non-linear medium (56) for optical frequency conversion in the medium (56) give a conversion efficiency which is higher than the conversion efficiency which would be achieved without the double refracting crystal (54) compensating for temporal offset.

2. The device according to claim 1, wherein a first (14) of the at least two laser beams (14, 16) is the fundamental beam from an ultra-short pulse laser and a second (16) of the at least two laser beams (14, 16) is the second harmonic of the first laser beam (14) which is generated in an optically non-linear crystal (26) by means of non-critical phase adaptation.

3. The device according to claim 1, wherein a first (14) of the at least two laser beams (14, 16) is the fundamental beam from an ultra-short pulse laser and a second (16) of the at least two laser beams (14, 16) is the second harmonic of the laser beam (14) which is generated in an optically non-linear crystal (26) with critical phase adaptation.

4. The device according to claim 1, wherein the optically non-linear medium (56) generates beam pulses with the sum frequency of the frequencies of the laser beams (14, 16).

5. The device according to claim 1, wherein the optically non-linear medium (56) generates beam pulses with the difference frequency of the frequencies of the laser beams (14, 16).

6. The device according to claim 1, wherein the double refracting crystal comprises KDP, YVO$_4$, quartz, LBO, BBO, or BiBO$_3$.

7. The device according to claim 1, wherein the double refracting crystal (54) has double refracting crystal components (54a, 54b), one (54b) of the crystal components being displaceable in relation to the other in order to continuously adapt the run times of the laser beams (14, 16) through the double refracting crystal (54).

8. The device according to claim 1, wherein the outlet facet of the optically nonlinear crystal (56), used to generate the sum or difference frequency, is not perpendicular to the propagation direction of at least one of the two beams.

9. The device according to claim 1, wherein the optically non-linear medium (56) is a crystal.

10. Method for optical frequency conversion of at least two laser beams (14, 16) of ultra-short beam pulses which have a temporal offset and a spatial walk-off, and in at least one optically non-linear medium (56) undergo a non-linear frequency conversion, said ultra-short pulses having a duration of less than 100 ps, characterized in that before the optically non-linear medium (56) is arranged a double refracting crystal (54), the length of which and the orientation of the optical crystal axis of which to the propagation direction of the laser beam are set such that the change caused by the double refracting crystal (54) in the location and time of incidence of the beam pulses (14, 16) on the optically non-linear medium (56), the direction of the walk-off in the double refracting crystal (54) being opposite the direction of the walk-off in the optically non-linear medium (56), and the resulting change in the spatial and temporal overlap of the beam pulses in the optically non-linear medium (56) for optical frequency conversion in the medium (56) give a conversion efficiency which is higher than the conversion efficiency which is achieved without the double refracting crystal (54) compensating for temporal offset.

11. Use of a double refracting crystal (54) in a device for optical frequency conversion of at least two laser beams (14, 16) of ultra-short beam pulses which have a temporal offset and a spatial walk-off, and which generate a frequency conversion in at least one optically non-linear medium (56), said ultra-short pulses having a duration of less than 100 ps, wherein the double refracting crystal (54) is arranged in the beam path before an optically non-linear medium (56) such that its length and the orientation of its optically active crystal axis relative to the propagation direction of the laser beams (14, 16) are such that the change caused by the double refracting crystal (54) in the location and time of incidence of the beam pulses (14, 16) on the optically non-linear medium (56), the direction of the walk-off in the double refracting crystal (54) being opposite the direction of the walk-off in the optically non-linear medium (56), and the resulting change in the spatial and temporal overlap of the beam pulses in the optically non-linear medium (56) for optical frequency conversion in the crystal (56) give a conversion efficiency which is higher than the conversion efficiency which is achieved without the double refracting crystal (54) compensating for temporal offset.

12. The device according to claim 2, wherein the double refracting crystal comprises BBO, KD*P, YVO$_4$, quartz, or LBO.

13. The device according to claim 3, wherein the double refracting crystal comprises KDP, YVO$_4$, quartz, LBO or BiBO$_3$.

14. The device according to claim 4, wherein the double refracting crystal comprises KDP, YVO$_4$, quartz, LBO or BiBO$_3$.

15. The device according to claim 5, wherein the double refracting crystal comprises KDP, YVO$_4$, quartz, LBO or BiBO$_3$.

16. The device according to claim 2, wherein the double refracting crystal (54) has double refracting crystal components (54a, 54b), one (54b) of the crystal components being displaceable in relation to the other in order to continuously adapt the run times of the laser beams (14, 16) through the double refracting crystal (54).

17. The device according to claim 16, wherein the outlet facet of the optically non-linear crystal (56), used to generate the sum or difference frequency, is not perpendicular to the propagation direction of at least one of the two laser beams.

18. The device according to claim 17, wherein the optically non-linear medium (56) is a crystal.

19. The device according to claim 1, wherein the optically non-linear medium (56) is a crystal.

20. The device according to claim 15, wherein the optically non-linear medium (56) is a crystal.

21. A device for optical frequency conversion, comprising:
an optically non-linear medium (56) introducing a spatial walk-off and a temporal offset into at least one of at least two pulsed laser beams (14, 16) passing through said optically non-linear medium; and a double refracting crystal (54) positioned in front of said optically non-linear medium (56), said double refracting crystal (54) having a length and being positioned relative to the optically non-linear medium (56) to introduce a spatial walk off and temporal offset into the said at least one of the two laser beams, said temporal offset and said spatial walk-off being opposite said temporal offset and said spatial walk-off introduced by said optically non-linear medium and being sufficient to cause said two pulsed laser beams to intersect temporally and spatially at a point within said optically non-linear medium (56).

22. The device of claim 21, wherein said intersection is both a temporal and spatial intersection, said intersection occurring at a single location within said optically non-linear medium (56) where said two pulsed laser beams meeting at the same time.

23. The device of claim 21, wherein said intersection point is at a midpoint within the optical non-linear medium in the direction of beam propagation.

24. The device of claim 23, wherein said at least two pulsed laser beams have ultra-short beam pulses with a duration of less than 100 Ps.

25. The device of claim 23, further comprising:
a crystal (26) for frequency doubling positioned before said double refracting crystal, said crystal for frequency doubling generating at least one of said two pulsed laser beams from a pulsed laser beam supplied to said crystal for frequency doubling.

26. The device of claim 25, wherein said crystal (26) for frequency doubling introduces temporal offset and wherein said double refracting crystal compensates for the introduced temporal offset.

27. A method of implementing an optical frequency converter, comprising:
introducing a spatial walk-off and a temporal offset into at least one of at least two pulsed laser beams (14, 16) by passing said at least two laser beams through an optically non-linear medium (56); and
prior to introducing said spatial walk-off and said temporal offset by passing said at least two laser beams through an optically non-linear medium (56), passing said at least two laser beams through a double refracting crystal (54) positioned in front of said optically non-linear medium (56), said double refracting crystal (54) having a length and being positioned relative to the optically non-linear medium (56) to introduce a spatial walk off and temporal offset into the said at least one of the two laser beams, said temporal offset and said spatial walk-off being opposite said temporal offset and said spatial walk-off introduced by said optically non-linear medium and being sufficient to cause said two pulsed laser beams to intersect temporally and spatially at a point within said optically non-linear medium (56).

28. The method of claim 27, further comprising:
calculating a spatial relationship between said optically non-linear medium (56) and said double refracting crystal (54) which results in said two pulsed laser beams intersecting temporally at a point within said optically non-linear medium (56).

29. The method of claim 28, wherein said intersection point is at a midpoint within the optical non-linear medium in the direction of beam propagation.

30. The device of claim 29, wherein said at least two pulsed laser beams have ultra-short beam pulses with a duration of less than 100 ps.

* * * * *

UNITED STATES PATENT AND TRADEMARK OFFICE
CERTIFICATE OF CORRECTION

PATENT NO. : 7,352,505 B2
APPLICATION NO. : 10/490844
DATED : April 1, 2008
INVENTOR(S) : Achim Nebel et al.

It is certified that error appears in the above-identified patent and that said Letters Patent is hereby corrected as shown below:

Column 14, Line 15, change "nonlinear" to --non-linear--.

Column 16, Line 3, change "Ps" to --ps--.

Column 16, Line 24, change "cystal" to --crystal--.

Signed and Sealed this

Fourth Day of November, 2008

JON W. DUDAS
*Director of the United States Patent and Trademark Office*